(12) United States Patent
Hsiao et al.

(10) Patent No.: US 6,927,940 B2
(45) Date of Patent: Aug. 9, 2005

(54) METHOD FOR SEED LAYER REMOVAL FOR MAGNETIC HEADS

(75) Inventors: Richard Hsiao, San Jose, CA (US);
Neil Leslie Robertson, Palo Alto, CA (US); Patrick Rush Webb, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 10/633,016

(22) Filed: Aug. 1, 2003

(65) Prior Publication Data

US 2004/0027718 A1 Feb. 12, 2004

Related U.S. Application Data

(62) Division of application No. 09/764,019, filed on Jan. 16, 2001, now Pat. No. 6,621,660.

(51) Int. Cl.[7] ............................................. G11B 5/147
(52) U.S. Cl. ...................................... 360/126; 360/123
(58) Field of Search ................................. 360/126, 123

(56) References Cited

U.S. PATENT DOCUMENTS

| | | | | |
|---|---|---|---|---|
| 4,694,368 A | * | 9/1987 | Bischoff et al. ............. | 360/126 |
| 5,047,115 A | | 9/1991 | Charlet et al. ............... | 156/643 |
| 5,059,278 A | | 10/1991 | Cohen et al. ............... | 156/643 |
| 5,157,570 A | * | 10/1992 | Shukovsky et al. ......... | 360/126 |
| 5,356,478 A | | 10/1994 | Chen et al. ................... | 134/1 |
| 5,846,441 A | * | 12/1998 | Roh ............................. | 216/22 |
| 6,260,256 B1 | | 7/2001 | Sasaki ....................... | 29/603.01 |
| 6,404,601 B1 | * | 6/2002 | Rottmayer et al. ......... | 360/126 |
| 6,466,401 B1 | * | 10/2002 | Hong et al. ................. | 360/123 |
| 6,490,127 B1 | * | 12/2002 | Sasaki ....................... | 360/126 |

FOREIGN PATENT DOCUMENTS

| | | |
|---|---|---|
| JP | 02230505 | 9/1990 |
| JP | 11283216 | 10/1999 |
| WO | PCT/EP01/15254 | 12/2001 |

OTHER PUBLICATIONS

IBM Technical Disclosure Bulletin, Nov. 1992, "Alternate Method for Etching Copper Seed Layers.".
IBM Technical Disclosure Bulletin, Jun. 1995, "NiFe/Cu Seed Layer for Plating Coil Cu in Magnetic Recording Heads.".

* cited by examiner

*Primary Examiner*—Robert S. Tupper
(74) *Attorney, Agent, or Firm*—Robert O. Guillot; Intellectual Property Law Offices

(57) ABSTRACT

The electroplated components of a magnetic head of the present invention are fabricated utilizing a seed layer that is susceptible to reactive ion etch removal techniques. A preferred seed layer is comprised of tungsten or titanium. Following the electroplating of the components utilizing a fluorine species reactive ion etch process the seed layer is removed, and significantly, the fluorine RIE process creates a gaseous tungsten or titanium fluoride compound removal product. The problem of seed layer redeposition along the sides of the electroplated components is overcome because the gaseous fluoride compound is not redeposited. The present invention also includes an enhanced two part seed layer, where the lower part is tungsten, titanium or tantalum and the upper part is composed of the material that constitutes the component to be electroplated.

8 Claims, 5 Drawing Sheets

METHOD FOR SEED LAYER REMOVAL FOR MAGNETIC HEADS

This application is a divisional of U.S. application Ser. No. 09/764,019, filed Jan. 16, 2001, now U.S. Pat. No. 6,621,660.

BACKGROUND OF THE INVENTION

1. Field of the Invention

The present invention relates generally to the fabrication of magnetic heads for hard disk drives, and more particularly to the fabrication and removal of seed layers utilized for electroplating magnetic head components such as induction coils and magnetic pole tips.

2. Description of the Prior Art

Several components of magnetic heads are typically fabricated utilizing electroplating processes, and a typical initial step in such electroplating processes is the deposition of an electrically conductive seed layer. A patterned photoresist is photolithographically fabricated upon the seed layer and the desired magnetic head component, such as an induction coil or a magnetic pole, is thereafter electroplated upon the seed layer within the patterned photoresist layer. Following the electroplating of the component, the photoresist layer is removed, and it is next necessary to remove the portions of the seed layer that are not covered by the electroplated component. The seed layer removal step is necessary to prevent electrical shorting of the components. In the prior art fabrication processes, an ion milling step or a sputter etching step is utilized to remove the seed layer.

The prior art seed layer removal step creates unwanted problems in magnetic heads. One problem is that portions of the removed seed layer become redeposited along the sides of the electroplated components. These redeposited seed layer portions can subsequently flake off and cause unwanted electrical shorting of the components. Additionally, the ion milling or sputter etching process also removes significant portions of the electroplated components that are exposed to it during the seed layer removal process. Thus, the electroplated components are plated up higher than would otherwise be necessary, such that after the seed layer removal process, the remaining thickness of the component is as desired. To fabricate the components with this additional thickness, the aspect ratio of the photoresist trenches must likewise be increased, and problems associated with the photolithographic fabrication of high aspect ratio trenches are encountered. Additionally, because it is necessary to ensure that the seed layer has been effectively removed from between the electroplated components, significant overetching is typically performed, which exacerbates the problems described hereabove. Additionally, the overetching can damage layers and structures beneath the seed layer.

As described below, the present invention solves these problems by utilizing a seed layer material that is susceptible to a reactive ion etch (RIE) removal process. Utilizing this RIE seed layer removal process, the seed layer redeposition problem is eliminated, the additional thicknesses of the components is not required, however the electroplated components are not substantially attacked by the RIE process, and seed layer overetching is not a problem because layers beneath the seed layer are not affected by the RIB process.

SUMMARY OF THE INVENTION

The electroplated components of a magnetic head of the present invention are fabricated utilizing a seed layer that is susceptible to reactive ion etch removal techniques. A preferred seed layer is comprised of tungsten or titanium and it is fabricated in a sputter deposition process. The seed layer is electrically conductive and the electroplated components, such as induction coil members and magnetic poles, are effectively electroplated into photolithographically created photoresist trenches that are fabricated upon the seed layer. Following the electroplating of the components, the photoresist layer is removed utilizing a standard wet chemical process to expose the seed layer. Next, utilizing a fluorine species reactive ion etch process the seed layer is removed, and significantly, the fluorine RIE process creates a gaseous tungsten or titanium fluoride compound removal product. The problem of seed layer redeposition along the sides of the electroplated components is overcome because the gaseous fluoride compound is not redeposited. Additionally, because the fluorine RIE process does not significantly attack the electroplated components, such as copper induction coil members and NiFe magnetic pole members, it is not necessary to electroplate these components to an additional thickness. Thus, the increased aspect ratio photoresist trenches that are problematic in the prior art are not required. Furthermore, overetching is not a problem because the fluorine RIE does not attack layers, such as aluminum oxide insulation layers, located beneath the seed layer.

The present invention also includes an enhanced two part seed layer, where the lower part is tungsten, titanium or tantalum and the upper part is composed of the material that constitutes the component to be electroplated. This two part seed layer is beneficial because a tungsten, titanium or tantalum seed layer (and particularly tantalum) may form an unwanted oxide surface coating which inhibits adhesion and electrical conduction to the electroplated component, and the upper seed layer part prevents the oxide formation.

It is an advantage of the magnetic head of the present invention that seed layer redeposition on the sides of electroplated components is eliminated.

It is another advantage of the magnetic head of the present invention that removal of the seed layer is efficiently accomplished without removal of material from other magnetic head components.

It is a further advantage of the magnetic head of the present invention that induction coil members can be spaced more closely together because seed layer removal between the components is more efficiently accomplished.

It is yet another advantage of the magnetic head of the present invention that induction coil members and magnetic pole members can be more easily fabricated because the aspect ratio of photoresist trenches can be reduced.

It is an advantage of the seed layer removal process of the present invention that it utilizes a reactive ion etch step which removes the seed layer in a gaseous compound.

It is another advantage of the seed layer removal process of the present invention that seed layer redeposition along the side of electroplated components is eliminated.

It is a further advantage of the seed layer removal process of the present invention that material removal of electroplated components does not occur during the seed layer removal process.

These and other features and advantages of the present invention will no doubt become apparent to those skilled in the art upon reading the following detailed description which makes reference to the several figures of the drawings.

IN THE DRAWINGS

Figure 13:
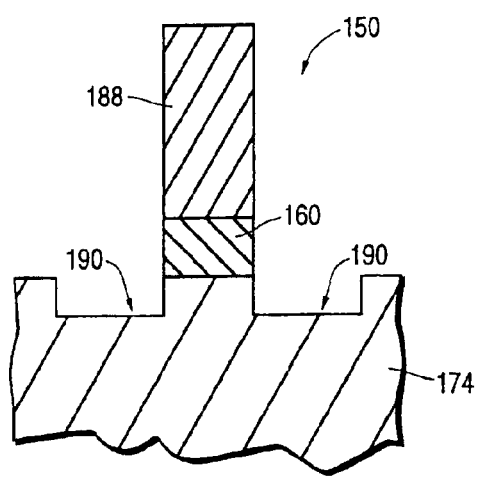
Figure 14:
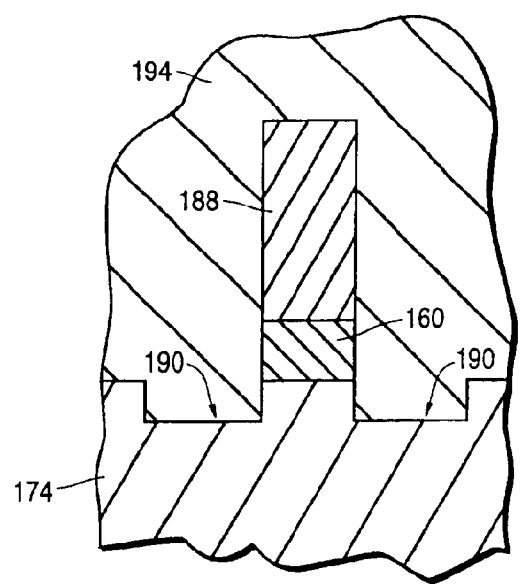
Figure 15:
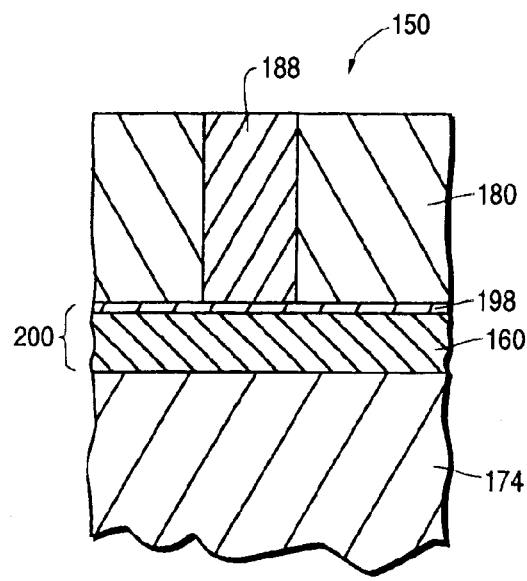
Figure 16:
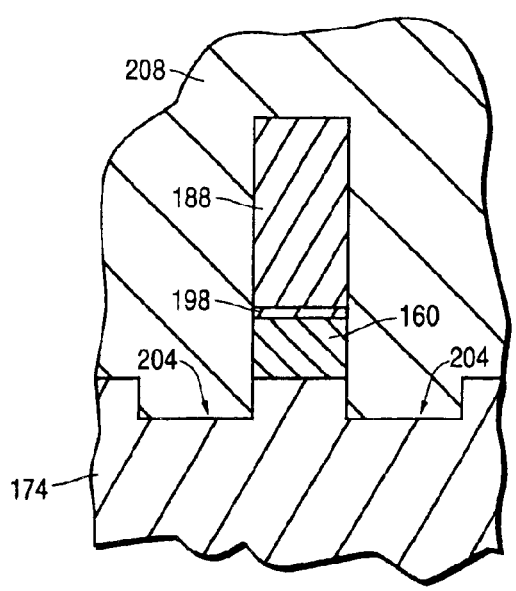

FIGS. 11, 12, 13 and 14 are side cross-sectional views depicting a seed layer of the present invention as utilized in fabricating a P2 pole tip of a magnetic head of the present invention; and FIG. 15 is a side cross-sectional view of an alternative two part seed layer of the present invention for P2 pole tip fabrication; and FIG. 16 is a side cross-sectional view of a fabricated P2 pole tip, including a two part seed layer of the present invention.

DETAILED DESCRIPTION OF THE PREFERRED EMBODIMENTS

Figure 1:
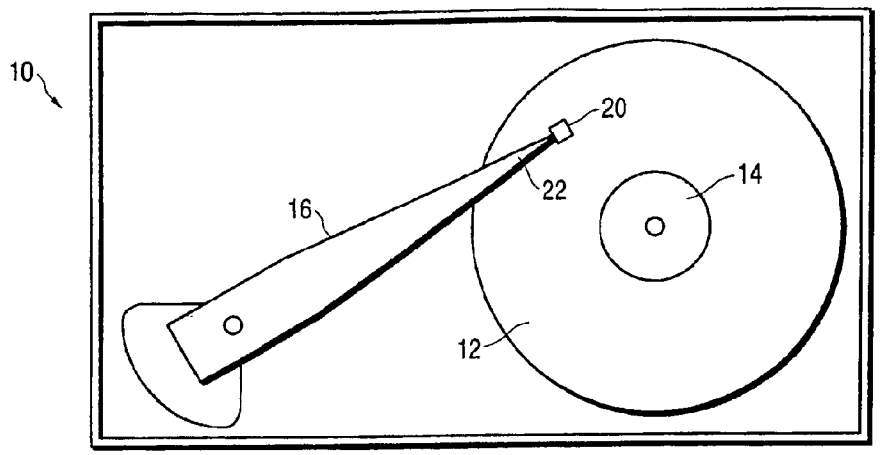
FIG. 1 is a top plan view of a hard disk drive including a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

Figure 2:
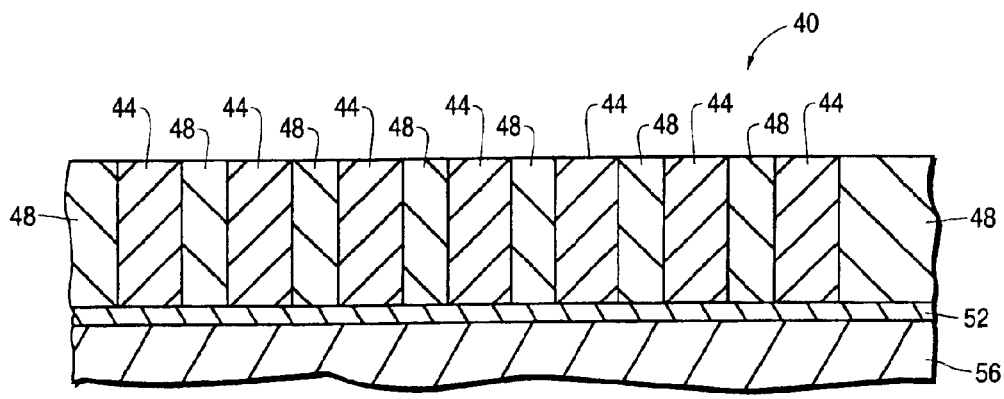
FIGS. 2, 3 and 4 are side cross-sectional views depicting prior art fabrication steps for removing a seed layer during the fabrication of induction coils of a magnetic head.
Figure 3:
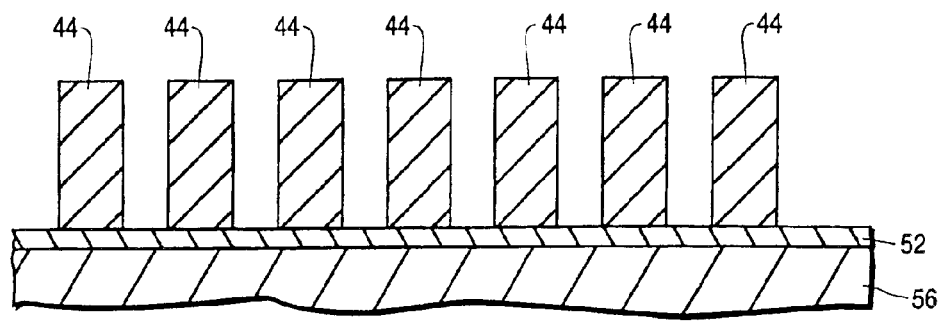
Figure 4:
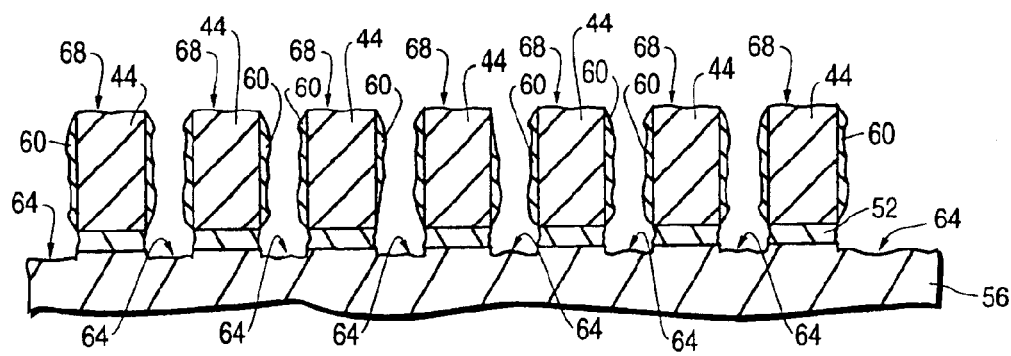

As is well known to those skilled in the art, magnetic heads for hard disk drives typically include a flat, spiral induction coil that is fabricated between the poles of a write head portion of the magnetic head. FIGS. 2–4 are side cross-sectional views depicting prior art fabrication steps for an induction coil of a magnetic head 40. As depicted in FIG. 2, a plurality of induction coil turns 44 have been fabricated within a patterned photoresist 48. The induction coils 44 are typically composed of copper and are fabricated in an electroplating process wherein a seed layer 52 has been previously deposited upon an insulation layer 56, which may include the write gap layer of the magnetic head 40. The seed layer 52 is typically composed of copper.

As is well known, it is necessary to remove the portions of the seed layer 52 between the induction coils 44 in order to prevent electrical shorting of the induction coil, and FIGS. 3 and 4 are side cross-sectional views which depict the prior art seed layer removal steps. Initially, as depicted in FIG. 3, the photoresist 48 between the induction coils 44 is removed, typically utilized a wet chemical process. Thereafter, as depicted in FIG. 4, the copper seed layer between the induction coils 44 is removed utilizing an ion milling or sputter etching fabrication technique. This seed layer removal technique has created problems in the prior art magnetic head fabrication process, and these problems have become more significant where improved magnetic head designs include coil members 44 that are placed closer together. Specifically, as depicted in FIG. 4, the prior art seed layer removal process typically results in significant redeposition 60 of the seed layer material along the sides of the induction coil members 44. Also, overetching 64, which can damage other head structures, is typically conducted in an effort to be assured that the seed layer has been sufficiently removed between the induction coil members. This seed layer removal process (and overetching) also results in the removal of significant top portions 68 of the induction coil members 44, and as much as 3,000 Å may be removed during seed layer removal. To compensate for this top portion removal, the induction coil members are purposely fabricated thicker than would otherwise be necessary, such that the final thickness of the induction coil members 44 will be appropriate after the seed layer removal step is completed. However, the fabrication of such thicker than necessary induction coil members 44 requires higher aspect ratio (depth to width) photolithographic trenches, and further fabrication problems are encountered thereby. The improved seed layer and seed layer removal method of the present invention avoids these problems and results in a magnetic head of the present invention with superior performance characteristics and fewer performance problems, as is next discussed with the aid of FIGS. 5–8.

Figure 5:
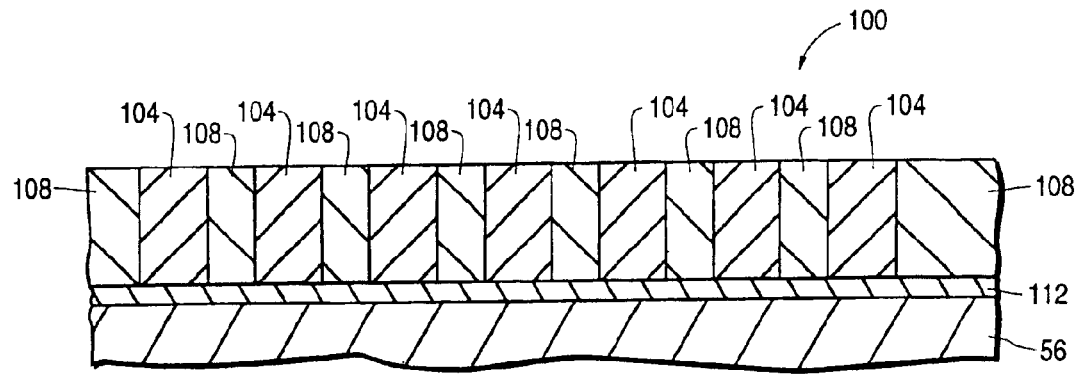
FIGS. 5, 6 and 7 are side cross-sectional views depicting the fabrication of induction coils utilizing a seed layer of the present invention for a magnetic head of the present invention.
Figure 6:
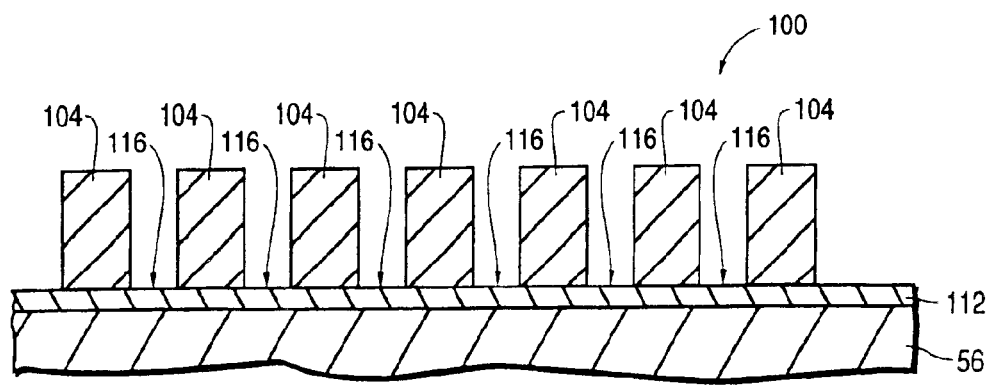

FIG. 5 is a side cross-sectional view of an induction coil portion of a magnetic head 100 of the present invention that is suitable for use as the magnetic head 20 of the hard disk drive depicted in FIG. 1. As depicted in FIG. 5, the magnetic head 100 includes a plurality of induction coil members 104 that have been fabricated within a patterned photoresist layer 108. A significant feature of the magnetic head 100 is that the seed layer 112 is composed of a material, which is susceptible to a reactive ion etch removal process, as is described below. The RIE etchable seed layer 112 is preferably comprised of tungsten or titanium where a fluorine ion species as RIE process is utilized. Initially, the seed layer 112 is fabricated utilizing a typical sputter deposition process or a CVD process that are well known to those skilled in the art, to a thickness of approximately 500 Å to 800 Å. Following the deposition of the seed layer 112, and the fabrication of the patterned photoresist trenches 108, the induction coil members 104 are electroplated on the seed layer in a substantially similar manner to that practiced in the prior art. Thereafter, as depicted in FIG. 6, the photoresist is removed between the induction coil members 104 using a typical, prior art wet chemical removal process. The seed layer portions 116 between the induction coil members 104 are thereby exposed.

Figure 7:
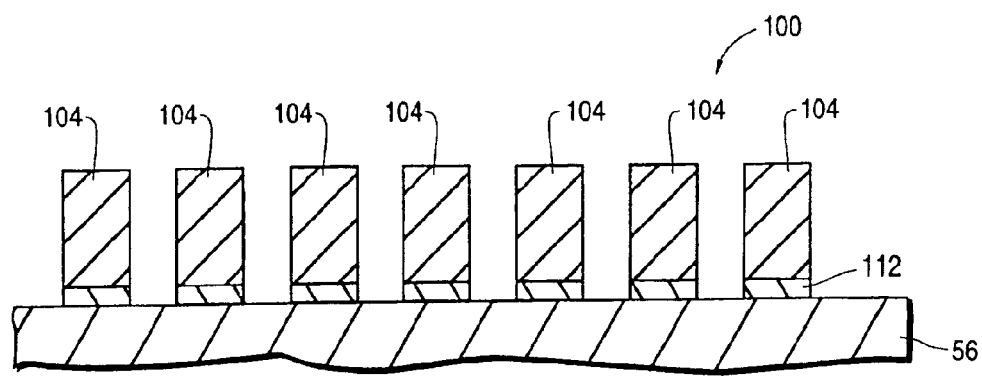

As is next depicted in FIG. 7, using a reactive ion etch process of the present invention, the seed layer portions 116 between the induction coil members 104 are removed. As indicated above, a significant feature of the present invention is that the seed layer 112 is composed of a substance that is susceptible to reactive ion etching. In the preferred embodiment, the reactive ion etching is conducted utilizing an etching source that creates fluorine ion containing species and wherein the seed layer reaction product is volatile. Thus, where tungsten or titanium is utilized as the seed layer 112, a low bias fluorine RIE process is conducted with an ion energy of approximately 100 eV, and the seed layer portions 116 are removed in a volatile tungsten or titanium fluoride gaseous state. Suitable fluorine source compounds for the RIE process include $CF_4$, $CHF_3$, $SF_6$, $C_2F_6$ and $C_3F_8$. Following the fluorine RIE removal of the seed layer of the present invention, typical magnetic head fabrication steps are undertaken, as are known to those skilled in the art, to complete the fabrication of the magnetic head 100 of the present invention.

The significant advantages of this fabrication process can be understood by comparing FIG. 7 with FIG. 4. Specifically, the seed layer redeposition 48 of FIG. 4 is eliminated in the magnetic head 100 of FIG. 7, because the fluoride compound seed layer removal product is volatile, such that no seed layer redeposition is formed in the magnetic head 100. Additionally, the copper induction coil members 104 are substantially unaffected by the fluorine RIE process, such that the tops of the induction coil members 104 are not removed in the RIE seed layer removal process. Therefore, as can be seen by comparing the initially plated induction coil members 104 of the magnetic head of the present invention (see FIG. 5) with the initially plated induction coil members 44 of the prior art (depicted in FIG. 2), the induction coil members 104 need not be fabricated to the thickness of the prior art induction coil members 44 because the top portion of the induction coil members 104 is not removed in the seed layer removal process. As a result, the aspect ratio of the photolithographic trenches 108 required to fabricate the induction coil members 104 is not as great as the aspect ratio of the prior art photolithographic trenches. Additionally, the fluorine RIE seed layer removal process of the present invention also does not substantially attack the insulation layer (typically aluminum oxide) beneath the seed layer. This overcomes the prior art problem of overetching, wherein the ion milling or sputter etch process that is undertaken to remove the prior art seed layer is conducted for an extended period of time to be assured that the seed layer 52 between the induction coil members 44 is fully removed, so that induction coil shorting will not occur. Furthermore, because the problem of seed layer redeposition along the sides of the induction coil members is not present when fabricating magnetic heads according to the present invention, the induction coil members can be fabricated closer together, which can lead to improved performance characteristics of the magnetic head 100, as is understood by those skilled in the art.

Figure 8:
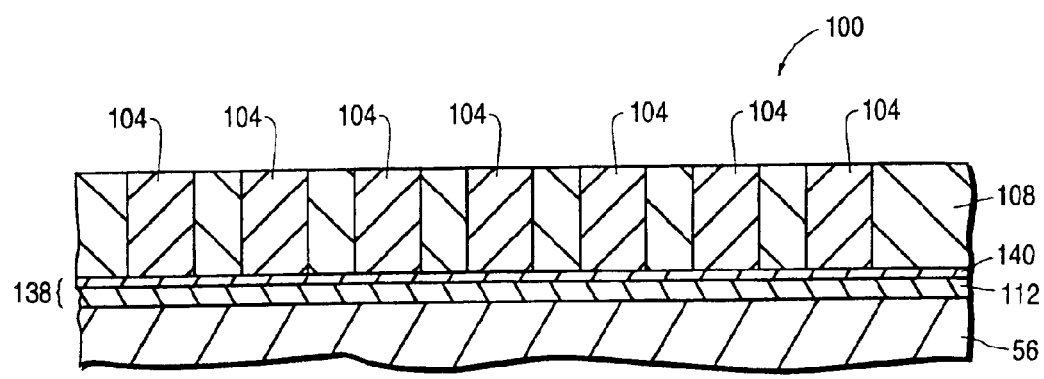
FIGS. 8, 9 and 10 are side cross-sectional views depicting the fabrication of induction coils using an alternative seed layer of the present invention for a magnetic head of the present invention.
Figure 9:
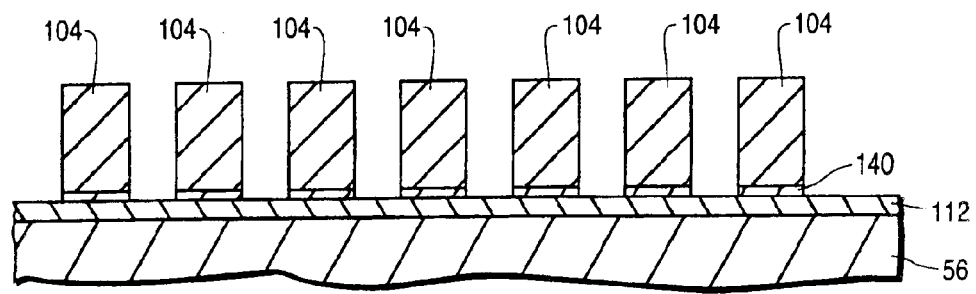
Figure 10:
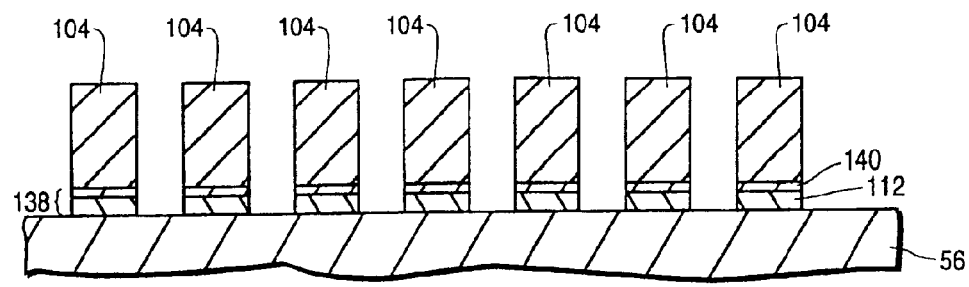

An alternative and improved two part seed layer 138 of the present invention can be created through the deposition of a thin copper seed layer upper portion 140 on top of the seed layer 112, as is depicted in FIG. 8. Specifically, it has been found that the upper surface of the seed layer 112 can form an oxide coating that inhibits adhesion and good electroplating of the copper induction coil members 104 on top of the seed layer 112. To inhibit the formation of the oxide surface on the seed layer 112, the thin copper film upper layer 140 having a thickness of approximately 100 Å is sputter deposited onto the seed layer 112 following the seed layer sputter deposition step. In this two part seed layer device, the lower seed layer 112 can be comprised of tungsten, titanium or tantalum. It is known that tantalum, without an upper seed layer 140 does not exhibit acceptable electroplating properties as a separate seed layer due to a significant oxide formation thereon. The thin film copper upper seed layer portion 140 serves to prevent the formation of an oxide surface coating, and promotes good electroplating of the copper induction coil members 104 within the patterned photoresist 108. However, as depicted in FIG. 9, following the photoresist removal, in the subsequent seed layer removal process the copper thin film upper layer 140 does require a short ion milling or sputter etch removal step (typically utilizing Ar) as is performed in the prior art seed layer removal, described hereabove. The seed layer redeposition problem and induction coil member top surface removal problems of the prior art are incurred; however, because the copper upper layer 140 is substantially thinner than the prior art seed layer 52, the redeposition and induction coil material removal problems are likewise significantly reduced. As is next depicted in FIG. 10, following the removal of the copper thin film upper layer 140 of the seed layer 138, the fluorine RIE process is conducted to remove the lower portion 112 of the seed layer 138 between the induction coil members 104. A magnetic head 100 that is fabricated utilizing the alternative two part seed layer 138, will have a seed layer portions beneath the induction coil members that include both a tungsten, titanium or tantalum portion and a copper portion.

Figure 11:
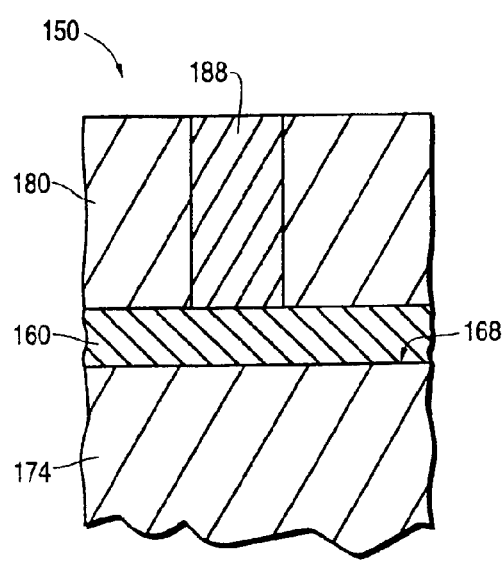
Figure 12:
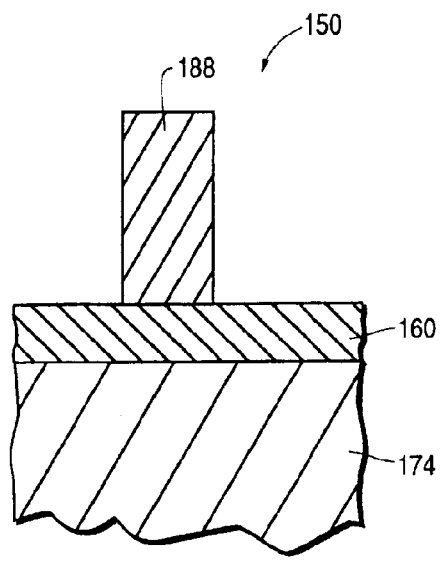

The seed layer and RIE seed layer removal process of the present invention is also applicable to the fabrication of the magnetic poles of the write head, and particularly the P2 pole tip, and FIGS. 11, 12, 13 and 14 depict the fabrication of a P2 pole tip utilizing the seed layer and seed layer removal process of the present invention. Specifically, FIG. 11 is a side cross-sectional view of a magnetic head 150 of the present invention in which a seed layer 160 of the present invention has been fabricated by sputter deposition on an upper surface 168 of a P1 pole 174. The seed layer 160 is preferably comprised of tungsten or titanium. A patterned photoresist 180 has been formed on top of the seed layer 160 and a P2 pole tip 188 has been fabricated within the patterned photoresist 180 on top of the seed layer 160. The P2 pole tip 188 is typically fabricated by the electroplating of a NiFe ferromagnetic material onto the seed layer 160. Thereafter, as depicted in FIG. 12, the photoresist 180 is removed utilizing a typical prior art wet chemistry process. Then, as depicted in FIG. 13, utilizing the fluorine RIE process of the present invention, the exposed portions of the tungsten seed layer 160 are removed. After removing the seed layer 160, an ion milling step can be conducted, such as with argon, to etch a notch 190 into the P1 pole for enhanced magnetic head performance, as is known to those skilled in the art. Thereafter, as depicted in FIG. 14, an insulative material 194 is deposited to encapsulate the P2 pole tip 188 and other magnetic head components, as is known to those skilled in the art.

A significant feature of the pole tip fabrication process of the present invention, as depicted in FIGS. 11–14 is that the removal of the seed layer 160 is accomplished without ion milling or sputter etching process of the prior art, and the removal of material from the top of the P2 pole tip, as happens in prior art fabrication processes do not occur. Specifically, prior art seed layer removal processes, which utilize ion milling or sputter etching, remove top portions of the exposed P2 pole tip as the prior art seed layer material is concurrently removed. Thus, as was discussed hereabove with regard to the prior art induction coil members 44, the prior art P2 pole tip fabrication process requires that a thicker than necessary P2 pole tip be fabricated, such that a desired P2 pole tip thickness will result following seed layer removal utilizing the prior art ion milling or sputter etching processes. Thus a photolithographic trench having a higher than necessary aspect ratio was required to fabricate the thicker prior art P2 pole tip. Also, because the P2 pole tip 188 of the present invention is not affected by the fluorine RIE seed layer removal step, the aspect ratio of the photolithographic trench 180 of the magnetic head 150 of the present invention is lower, and the fabrication of the P2 pole tip of the present invention is thereby facilitated. Of course, where a P1 pole notching step is performed, the ion milling step will remove some of the top surface of the P2 pole tip.

Another significant feature of the magnetic head 150 of the present invention is that the seed layer 160 can be fabricated with a thickness of approximately 500 Å to 2,000 Å that allows it to be utilized as a write gap layer. That is, as depicted in FIGS. 11–14, the seed layer 160 is fabricated between the P1 pole 174 and the P2 pole tip 188 to function as the write gap layer 160. The tungsten or titanium seed layer 160 is effective in this regard because it is magnetically nonconductive, such that it will function as an effective write gap layer; however, it is electrically conductive, such that it will serve as a good seed layer for the electroplating process that is utilized to fabricate the NiFe P2 pole tip. Advantageously, the extra step of depositing a write gap layer is not required in the magnetic head 150. Where the write gap/seed layer and fluorine RIE seed layer removal process are utilized, and when a P1 pole notching step is conducted, the amount of material removed from the tip of the P2 pole tip is reduced over the prior art, because the write gap layer of the present invention is removed by an RIE process rather than the ion milling process of the prior art.

As has been described hereabove, the top surface of a seed layer 160 can form an oxide surface coating, and this can inhibit the adhesion and electroplating of the NiFe pole tip 188 upon it. To overcome this, as depicted in FIG. 15, a NiFe upper seed layer portion 198 can be fabricated preferably by sputter deposition onto the lower seed layer portion 160 following the fabrication of the lower seed layer to create a two part seed layer 200. The NiFe upper seed layer portion 198 is deposited to a thickness of approximately 100 Å, and serves to prevent the formation of an oxide surface on the lower seed layer portion 160, such that good adhesion and electrical conductivity for the electroplating of the NiFe P2 pole tip is obtained. In this two part seed layer device, the lower seed layer 160 can be comprised of tungsten, titanium or tantalum. It is known that tantalum, without an upper seed layer 198 does not exhibit acceptable electroplating properties as a separate seed layer due to a significant oxide formation thereon. The P2 pole tip 188 is electroplated into the patterned photoresist 180, followed by the wet chemical removal of the photoresist. Thereafter, as depicted in FIG. 16, an ion milling or sputter etching step (typically using Ar) must be first undertaken to remove the NiFe top layer 198 of the seed layer, followed by the fluorine RIE process of the present invention that is undertaken to remove the lower tungsten, titanium or tantalum seed layer portion 160. Also, after removing the seed layer 160 a further ion milling step can be conducted to etch a notch 204 into the P1 pole to produce a desirable notched P1 pole design. After further write head fabrication steps as are known to those skilled in the art, the P2 pole tip 188 and other components are encapsulated within an insulation layer 208 as is shown in FIG. 16.

While the present invention has been shown and described with reference to certain preferred embodiments, it is to be understood that those skilled in the art will no doubt devise alterations and modifications in form and detail which nevertheless include the basic spirit and scope of the invention. It is therefore intended that the following claims cover all such alterations and modifications.

What we claim is:

1. A magnetic head comprising:
   a write head portion including a first magnetic pole and a second magnetic pole;
   a seed layer being disposed between said first magnetic pole and said second magnetic pole, said second magnetic pole being disposed upon said seed layer;
   said seed layer being comprised of a material selected from the group consisting of tungsten and titanium.

2. A magnetic head as described in claim 1 wherein said seed layer is formed with a thickness of approximately 500 Å to 2,000 Å.

3. A magnetic head comprising:
   a write head portion including a first magnetic pole and a second magnetic pole;
   a seed layer being disposed between said first magnetic pole and said second magnetic pole;
   wherein said second magnetic pole is comprised of an NiFe, and wherein said seed layer includes a lower part being comprised of a material selected from the group consisting of tungsten, tantalum and titanium, and an upper part comprised of NiFe, and wherein said second magnetic pole is disposed upon said NiFe upper part of said seed layer.

4. A magnetic head as described in claim 3 wherein said NiFe upper part of said seed layer is formed with a thickness of approximately 100 Å, and said lower part of said seed layer is formed with a thickness of approximately 500 Å to 2,000 Å.

5. A hard disk drive comprising:
   at least one hard disk being adapted for rotary motion upon a disk drive;
   at least one magnetic head being adapted to fly over said hard disk for writing data on said hard disk, said magnetic head including:
   a write head portion including a first magnetic pole and a second magnetic pole;
   a seed layer being disposed between said first magnetic pole and said second magnetic pole, said second magnetic pole being disposed upon said seed layer;
   said seed layer being comprised of a material selected from the group consisting of tungsten and titanium.

6. A hard disk drive as described in claim 5 wherein said seed layer is formed with a thickness of approximately 500 Å to 2,000 Å.

7. A hard disk drive comprising:
   at least one hard disk being adapted for rotary motion upon a disk drive;
   at least one magnetic head being adapted to fly over said hard disk for writing data on said hard disk, said magnetic head including:
   a write head portion including a first magnetic pole and a second magnetic pole;
   a seed layer being disposed between said first magnetic pole and said second magnetic pole;
   wherein said second magnetic pole is comprised of an NiFe, and wherein said seed layer includes a lower part being comprised of a material selected from the group consisting of tungsten, tantalum and titanium and an upper part comprised of NiFe, and wherein said second magnetic pole is disposed upon said NiFe upper part of said seed layer.

8. A hard disk drive as described in claim 7 wherein said NiFe upper part of said seed layer is formed with a thickness of approximately 100 Å, and said lower part of said seed layer is formed with a thickness of approximately 500 Å to 2,000 Å.

* * * * *